United States Patent [19]
Smith

[11] Patent Number: 4,488,565
[45] Date of Patent: Dec. 18, 1984

[54] HAY RACK TOP

[76] Inventor: Douglas D. Smith, Rte. 3, Box 132E, West Monroe, La. 71201

[21] Appl. No.: 464,424

[22] Filed: Feb. 7, 1983

[51] Int. Cl.³ .............................................. E04G 11/04
[52] U.S. Cl. ........................................ 135/100; 52/63; 52/4; 135/88; 119/60
[58] Field of Search ................... 135/100, 95, 902, 94, 135/901, 96; 52/3, 4, 63; 119/60; 272/1 B

[56] References Cited

U.S. PATENT DOCUMENTS

| | | | |
|---|---|---|---|
| 1,287,773 | 12/1918 | Schumacher | 119/60 |
| 1,599,213 | 9/1926 | Coupal | 135/100 |
| 1,867,272 | 7/1932 | Larson | 135/88 |
| 2,635,302 | 4/1953 | Denning | 52/63 |
| 3,540,170 | 9/1968 | Flowers | 135/901 |
| 4,214,407 | 7/1980 | Charter | 52/63 |

FOREIGN PATENT DOCUMENTS 737553 12/1932 France .................................. 52/4

Primary Examiner—Richard J. Apley
Assistant Examiner—S. R. Crow
Attorney, Agent, or Firm—John M. Harrison

[57] ABSTRACT

A hay rack top which is designed to fit on conventional hay rack enclosures or bunks in order to protect hay bales and hay placed in the enclosure from the elements, which includes multiple, shaped braces designed for clamping in spaced relationship to the top ring of a conventional hay rack and extending upwardly and inwardly to support a flexible cover secured on the arms of the braces by means of a draw string tightened around shoulders shaped in the braces. The braces are easily removed from the hay rack by loosening the clamps, and the top can be quickly and easily removed from the braces by loosening the draw string.

15 Claims, 6 Drawing Figures

HAY RACK TOP

BACKGROUND OF THE INVENTION

1. Field of the Invention

This invention relates to protective coverings for hay, and more particularly, to a flexible, protective covering for round and square bales of hay, as well as loose hay which is placed in a conventional hay rack or bunk for dispensing to animals. The hay rack top of this invention includes a set of braces which are each removably clamped to the top ring of the hay rack or bunk, and extend upwardly, then outwardly to define a shoulder projection, and subsequently inwardly, as an extending arm, to support a flexible cover. The cover is provided with a drawstring and is secured to the braces by tightening the drawstring around the shoulders formed in the braces. The braces and cover can be quickly and easily removed from the hay rack to expose the hay in good weather, and assembled in a minimum of time to protect the enclosed hay during inclement weather.

2. Description of the Prior Art

The hay rack top of this invention is designed for use with conventional hay racks such as the "Portable Animal Feed Bunk", disclosed in U.S. Pat. No. 3,851,624, to Leonard R. Peak. The feed bunk of this invention is characterized by three tubular rings which are spaced by vertical tubular members to define openings which allow animals to reach hay which is enclosed in the bunk. The circular structure may be designed for disassembly, or it may be built in a unitized structure, as desired.

Protection devices for hay stacks and bales are known in the prior art. An early "Adjustable Stack Protector", is disclosed in U.S. Pat. No. 715,603, to A. Quarrie, et al, which protector includes a conical cover having a longitudinal slit or incision which extends from the apex through the edge, whereby the cover can be brought into overlapping relationship over the top of a stack of hay or a hay bale, to protect the top of the bale from inclement weather. A similiar "Protecting Roof for Hay Stacks" is disclosed in U.S. Pat. No. 1,106,353, to F. Adamec. This cover is also shaped in a generally conical configuration with a slit running from the apex to the edge, and is secured in position on the hay by a pair of pegs attached to strings or cords. A "Knock-Down Adjustable Position Canopy Mounting" for protecting a picnic table is illustrated in U.S. Pat. No. 3,176,699, to G. R. Rollens, which canopy includes four support braces supporting a frame and a flexible cover mounted to the frame, the assembly provided with mechanical means for effecting a folding configuration when not in use. U.S. Pat. No. 3,952,463, to Duane W. Lane, illustrates a support for a flexible cover, which structure includes multiple support arms or members having a folding mechanism at one end and a telescoping means therein to adjust the effective length of the support arms and collapse the structure roof, as desired. A "Canopy Supporting Frame and Canopy", is disclosed in U.S. Pat. No. 3,890,989, to Benjamin Kuxhouse. This device includes two end frame assemblies supported in upright, spaced-apart relationship and connected to each other by a medial bow member and two lateral bow members which support a canopy of pliable material. The medial bow member serves as a ridge pole for the canopy, and the edges of the canopy are attached to two lateral bow members which are adjustably supported by arms forming parts of the end frame assemblies and which can be moved to change the pitch of the canopy by keeping the areas of the canopy at the two sides of the medial bow constant and tightly stretched. The entire assembly can be folded into a compact bundle. U.S. Pat. No. 1,588,820, to A. Spillman, discloses a "Cover Structure for Amusement Devices", which includes a flexible cover mounted on a frame which is designed to compensate for differences in elevation in the amusement device.

It is an object of this invention to provide a hay rack top which can be fitted to conventional hay racks or bunks, and is characterized by multiple, shaped support braces which clamp to the hay rack or bunk in spaced relationship and support a flexible or pliable top or cover, which is secured to the braces by means of a drawstring.

Another object of the invention is to provide a new and improved top for covering hay bales and quantities of hay stored in conventional hay racks or bunks, which top includes multiple metal brace members removably clamped to the top of the hay rack or bunk in spaced relationship and extending upwardly and shaped to define shoulders which engage a flexible or pliable top or cover secured to the shaped braces by means of a drawstring.

A still further object of the invention is to provide a new and improved cover for round and square hay bales and loose quantities of hay stored in conventional hay racks or bunks, which includes multiple braces, each having a clamp means at one end and shaped to define an outwardly-projecting shoulder near the center thereof and an inwardly extending arm for supporting a flexible top or cover, the edge of the cover corresponding to the shoulders formed in the braces, respectively, and a drawstring provided in the edge of the top and tightened around the shoulders to secure the top to the braces.

Yet another object of this invention is to provide a new and improved cover for bales of hay located in conventional round hay racks or bunks, which cover includes multiple, shaped, one-piece braces removably clamped in spaced relationship to the top ring of the hay rack and extending upwardly in shaped configuration to define shoulders extending outwardly of the braces and arms extending inwardly of the braces to support a flexible top or cover, the periphery of the cover provided with a hem containing a drawstring for drawing around the shoulders of the braces, in order to secure the cover to the braces by tying the ends of the drawstring.

SUMMARY OF THE INVENTION

These and other objects of the invention are provided in a new and improved hay rack top for mounting on the top ring of a conventional circular hay rack or bunk, which top includes multiple braces, each having a clamp means at one end for corresponding with and clamping in spaced relationship to the top ring of the rack or bunk, the braces extending upwardly with a shaped shoulder provided therein and arms extending inwardly to a center position, for supporting a cover which is provided with a drawstring near the periphery thereof, the peripheral edge of the cover corresponding to the shoulders of the braces, respectively, and the drawstring securing the cover to the shoulders by tightening the ends of the drawstring to prevent the cover from blowing from the braces in inclement weather.

The invention will be better understood by reference to the accompanying drawing, wherein.

DESCRIPTION OF THE PREFERRED EMBODIMENTS

Figure 1:
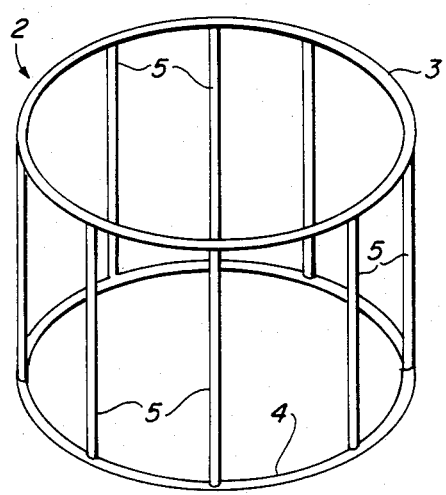
FIG. 1 is a perspective view of a conventional round hay rack or a bunk.
Figure 3:
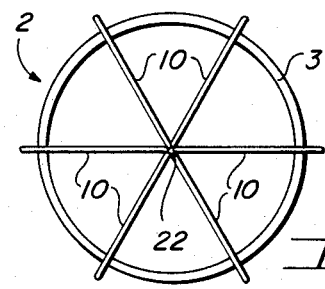
FIG. 3 is a top elevation of the mounted hay rack top braces illustrated in FIG. 2.
Figure 2:
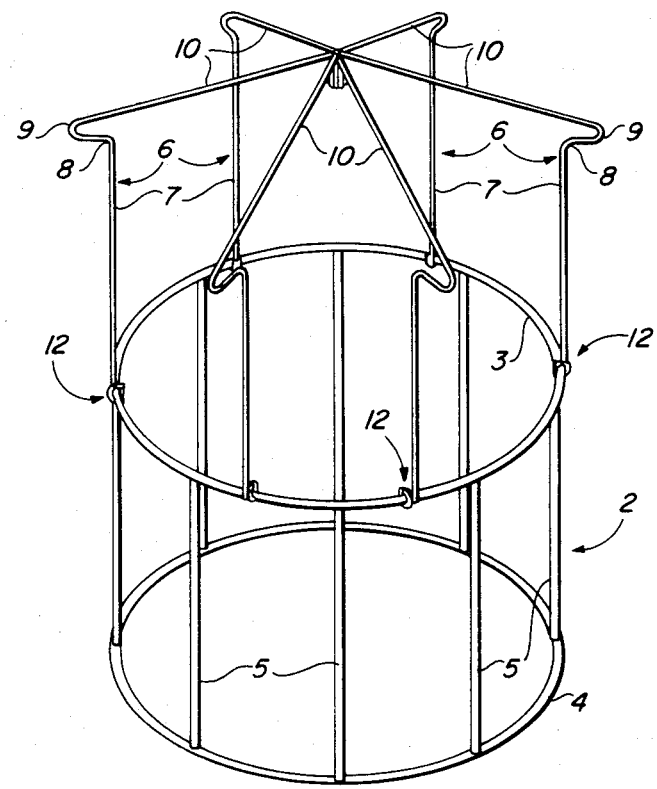
FIG. 2 is a perspective view of the hay rack illustrated in FIG. 1, with the braces of the hay rack top of this invention in functional position on the rack.
Figure 5:
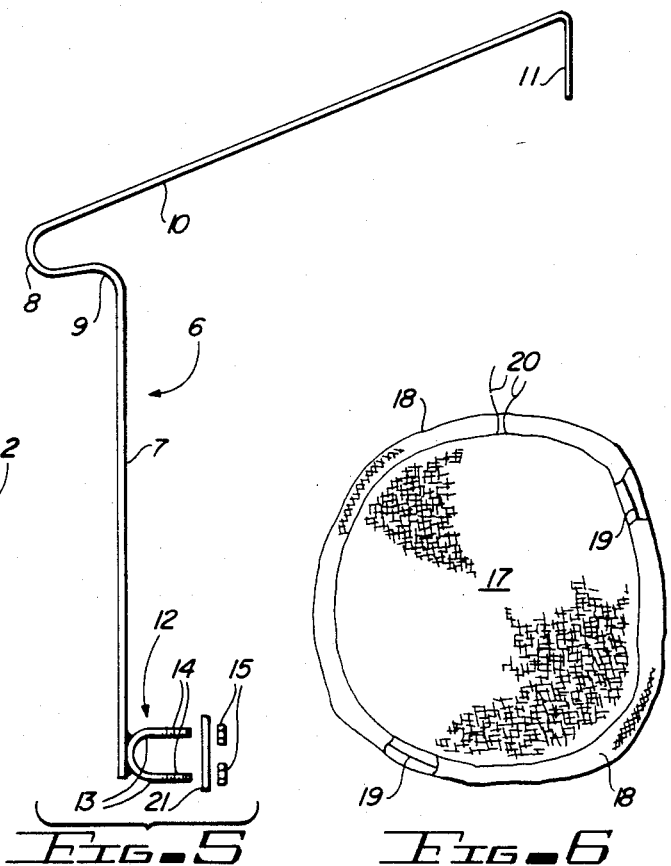
FIG. 5 is a side elevation of a preferred brace used in the hay rack top of this invention.

Referring now to FIG. 1 of the drawing, a conventional hay rack or bunk is disclosed, which rack is circular in configuration in order to easily accommodate round hay bales, and as well as square bales and loose hay. The hay rack is generally illustrated by reference numeral 2 and includes a top ring 3 and a bottom ring 4, spaced from top ring 3 by multiple ring supports 5. A quantity of hay, either in the form of square or round bales or loose hay, can be placed inside the hay rack 2 and cattle are able to reach the hay by thrusting their heads between the rings and adjacent ring supports 5, but are unable to move into the interior of the hay stack 2 to trample the hay. As heretofore described, one of the problems associated with conventional hay racks and bunks is the lack of protection afforded due to inclement weather, a factor which frequently renders much of the hay unfit for consumption by the animals. Referring now to FIGS. 2, 3 and 5 of the drawing, in a preferred embodiment of the invention each of the multiple braces 6 are secured to the top ring 3 of the hay rack 2 by means of a U-bolt 12, featuring U-bolt legs 13, which are provided with leg threads 14, and secured to the brace legs 7 of the braces 6. The U-bolt legs 13 are positioned on each side of the top ring 3 of hay rack 2, and a drilled plate 21 is then placed in registration with the U-bolt legs 13, and nuts 15 are secured to the leg threads 14, to fasten each of the braces 6 in upward standing, generally vertical position, as illustrated in FIG. 2. As further illustrated in FIG. 5, each of the braces 6 is provided with a straight brace leg 7, extending upwardly from a U-bolt 12 and shaped to define a curved offset 8 at the top end thereof, and then shaped again to an outwardly-extending shoulder 9, and a brace arm 10, which extends upwardly at about a 65 degree angle with respect to the brace leg 7. While a 65 degree angle is preferred in the brace arms 10 with respect to the brace legs 3, respectively, other angles can be effected depending upon the desired pitch of the brace arms 10. An arm flange 11 is then shaped downwardly in the brace arm 10 to provide a means for connecting the brace arms 10 together at the center 22, as illustrated in FIG. 3.

Figure 4:
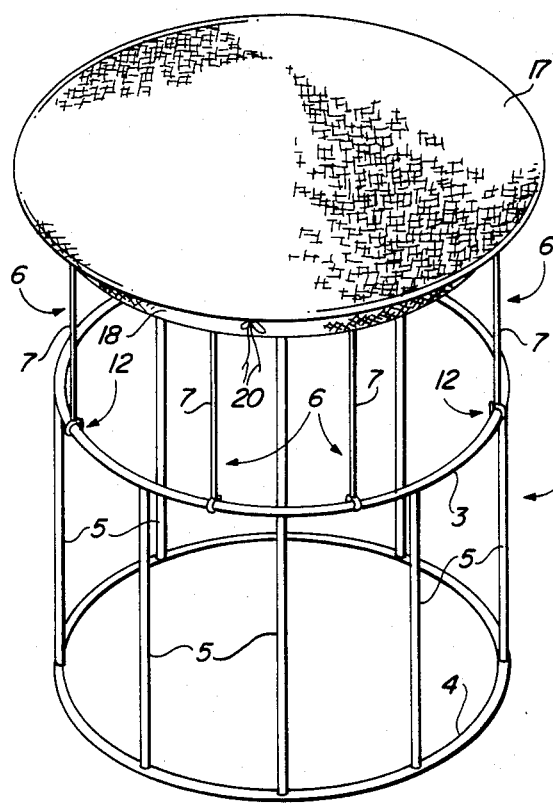
FIG. 4 is a perspective view of the hay rack top, including the braces and cover in functional position on the hay rack illustrated in FIG. 1.
Figure 6:
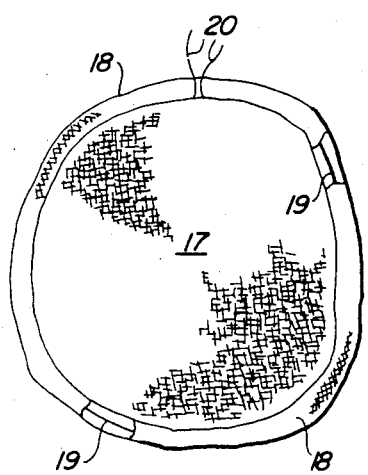
FIG. 6 is a view of the underside of a preferred cover for use in the hay rack top of this invention.

Referring now to FIGS. 4 and 6 of the drawing, in a preferred embodiment of the invention a cover 17 is provided, which is generally circular in shape and is lapped at the edges to accommodate a drawstring 19, with drawstring ends 20, which extend from the hem 18 and can be pulled tightly toward each other to secure the hem 18 and the cover 17 tightly beneath the offset 8 in each of the braces 6, the shoulders 9 serving to prevent the cover 17 from blowing off of the brace 6 during windy conditions. Accordingly, when cover 17 is thus deployed on the braces 6 as illustrated in FIG. 4, and when the drawstring ends 20 are tied as illustrated, the cover is securely and removably mounted on the braces 6 and provides protection to the hay located inside the hay rack 2.

While the cover 17 used in the hay rack 1 of this invention can be shaped of substantially any flexible or pliable material, a vinyl material is preferred, because of the weather resistance and ease of shaping the hem 18 and inserting the drawstring 19. In a most preferred embodiment of the invention a vinyl cover 17 is provided with a hem 18 containing a nylon drawstring, the drawstring ends 20 of which project from the hem in close proximity to each other to facilitate tying, as illustrated in FIG. 4.

In another most preferred embodiment of the invention each of the braces 6 are shaped from a single length of steel rod having a diameter of from about ⅜ inches to about ⅝ inches, and about 94 inches long, with three bends defining the brace leg 7, offset 8, shoulder 9, brace arm 10 and arm flange 11. The offset 8 is most preferably curved upwardly at the first bend between brace leg 7 and shoulder 9, in order to prevent water from flowing from the cover 17 at each shoulder 9, back around hem 18 at offset 8, and down brace leg 7 to drip on the hay inside hay rack 2. In a further most preferred embodiment the hay rack top 1 is characterized by six braces clamped to the top ring 3 of hay rack 2 by means of the U-bolts 12, which are welded to the brace legs 7. While a preferred length of braces 6 is 94 inches, it will be appreciated that braces 6 may be provided in varying lengths in order to accommodate conventional hay racks of varying length.

The hay rack top 1 of this invention is easily secured to and removed from the hay rack 2 by means of nuts 15, which are threaded on U-bolt legs 13 of U-bolts 12, as heretofore described. Furthermore, the arm flanges 11, ganged as illustrated in FIG. 3, can be clamped, wired, or otherwise joined, and the entire hay rack top 1 can be moved while installed on the hay rack 2, by tipping the hay rack 2 on its side and rolling it to a desired location. The hay rack top serves as a versatile and portable shelter for animals while the animals eat the hay, which is kept dry and free of snow. It can be installed on virtually any conventional hay rack or bunk which contains loose hay, round bales or square hay bales of hay. The hay rack top is also useful for feeding any animals, including horses and cattle, in non-exclusive particular.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A hay rack top for mounting on conventional hay racks comprising a plurality of brace means, each of said brace means characterized by a fastening means at one end; a substantially straight leg segment extending from said fastening means; a shoulder bend provided at the extending end of said leg segment and an arm segment extending from said shoulder bend at a selected angle with respect to said leg segment; a flange segment provided in the end of said arm segment opposite said shoulder bend; cover means resting on said arm segment and extending around said shoulder bend; and securing means provided on said cover means, whereby said cover means is secured on said arm segment and around said shoulder bend.

2. The hay rack of claim 1 wherein:
 (a) said shoulder bend extends outwardly of said leg segment, and further comprising an upwardly curved offset segment disposed between said leg segment and said shoulder bend; and
 (b) said fastening means is U-bolt secured to said leg segment, a plate having apertures therein cooperating with the legs of said U-bolt and threaded nuts also cooperating with said U-bolt, whereby said U-bolt is secured to the conventional hay racks by means of said plate and said nuts.

3. The hay rack top of claim 2 wherein said leg segment, said offset segment, said shoulder bend, said arm segment and said flange segment are characterized by a single length of metal rod.

4. The hay rack of claim 1 wherein:
 (a) said shoulder bend extends outwardly of said leg segment, and further comprising an upwardly curved offset segment disposed between said leg segment and said shoulder bend;
 (b) said fastening means is a U-bolt secured to said leg segment, a plate having apertures therein cooperating with the legs of said U-bolt and threaded nuts also cooperating with said U-bolt, whereby said U-bolt is secured to the conventional hay racks by means of said plate and said nuts; and
 (c) said cover means is a flexible cover, a hem provided in the edge of said cover and said securing means is a drawstring in said hem whereby said cover is positioned on said arm segments of each of said braces and said hem is secured on said offset segment beneath said shoulder bend of each of said braces by tightening said drawstring.

5. A hay rack top for mounting on conventional hay racks comprising a plurality of shaped braces cooperating with the hay rack top in spaced relationship, said braces each further comprising a substantially straight leg segment, fastening means secured to one end of said leg segment for engaging the hay rack top; an upwardly curved offset segment extending from the opposite end of said leg segment from said fastening means; a shoulder bend provided in said offset segment and extending outwardly of said leg segment; an arm segment extending from said shoulder bend and inwardly of said leg segment at a preselected angle with respect to said leg segment; a flange segment provided in said arm segment at the end of said arm segment opposite said shoulder bend; and a flexible cover shaped and adapted to rest on said arm segment and said shoulder bend of each of said shaped braces, said flexible cover further characterized by a drawstring whereby said cover is secured on said arm segment and said shoulder bend of each of said shaped braces responsive to tightening said drawstring around said offset segment under said shoulder bend.

6. The hay rack top of claim 5 wherein said fastening means is a U-bolt having a pair of U-bolt legs engaging the hay rack, a cooperating plate provided with plate apertures in registration with said U-bolt legs and threaded nuts cooperating with said U-bolt legs, whereby said plate is secured against the hay rack to support said braces.

7. The hay rack top of claim 5 wherein said flange segment extends from said end of said arm segment opposite said shoulder bend in essentially parallel relationship with respect to said leg segment.

8. The hay rack top of claim 5 wherein:
 (a) said fastening means is a U-bolt having a pair of U-bolt legs engaging the hay rack, a cooperating plate provided with plate apertures in registration with said U-bolt legs and threaded nuts cooperating with said U-bolt legs, whereby said plate is secured against the hay rack to support said braces; and
 (b) said flange segment extends from said one end of said arm segment opposite said shoulder bend in essentially parallel relationship with respect to said leg segment.

9. The hay rack top of claim 5 wherein said leg segment, said offset segment, said shoulder bend, said arm segment and said flange segment are characterized by a single length of metal rod.

10. The hay rack top of claim 5 wherein:
 (a) said fastening means is a U-bolt having a pair of U-bolt legs engaging the hay rack, a cooperating plate provided with plate apertures in registration with said U-bolt legs and threaded nuts cooperating with said U-bolt legs, whereby said plate is secured against the hay rack to support said braces;
 (b) said flange segment extends from said one end of said arm segment opposite said shoulder bend in essentially parallel relationship with respect to said leg segment; and
 (c) said leg segment, said offset segment, said shoulder bend, said arm segment and said flange segment are characterized by a single length of metal rod.

11. A hay rack top for mounting on a round hay rack having a top support member comprising at least three shaped braces, each of said braces characterized by a clamp means; a leg segment having one end secured to said clamp means and the opposite end shaped to define a curved offset segment; a shoulder bend extending from said offset segment outwardly of said leg segment; an arm segment extending from said shoulder bend inwardly of said leg segment and upwardly at a preselected angle with respect to said leg segment; a flange segment provided in the extending end of said arm segment, said flange segment projecting downwardly in essentially parallel relationship with respect to said leg segment; and cover means conforming substantially to the shape of said arm segment, said shoulder bend and said offset segment.

12. The hay rack top of claim 11 wherein said at least three shaped braces is six braces attached in spaced relationship to the top support member of the hay rack, by said clamp means.

13. The hay rack of claim 11 wherein said cover means is a shaped flexible cover, a hem provided in the edge of said cover and a drawstring in said hem whereby said cover is positioned on said arm segment of each of said braces and said hem is secured on said offset segment beneath said shoulder bend of each of said braces by tightening said drawstring.

14. The hay rack of claim 11 wherein:
 (a) said at least three braces is six braces attached in spaced relationship to the top support member of the hay rack by said clamp means; and (b) said cover means is a shaped flexible cover, a hem provided in the edge of said cover and a drawstring in said hem whereby said cover is positioned on said arm segment of each of said braces and said hem is secured on said offset segment beneath said shoulder bend of each of said braces by tightening said drawstring.

15. The hay rack of claim 14 wherein said leg segment, said offset segment, said shoulder bend, said arm segment and said flange segment are characterized by a single length of metal rod.

* * * * *